United States Patent Office 3,459,004
Patented Aug. 5, 1969

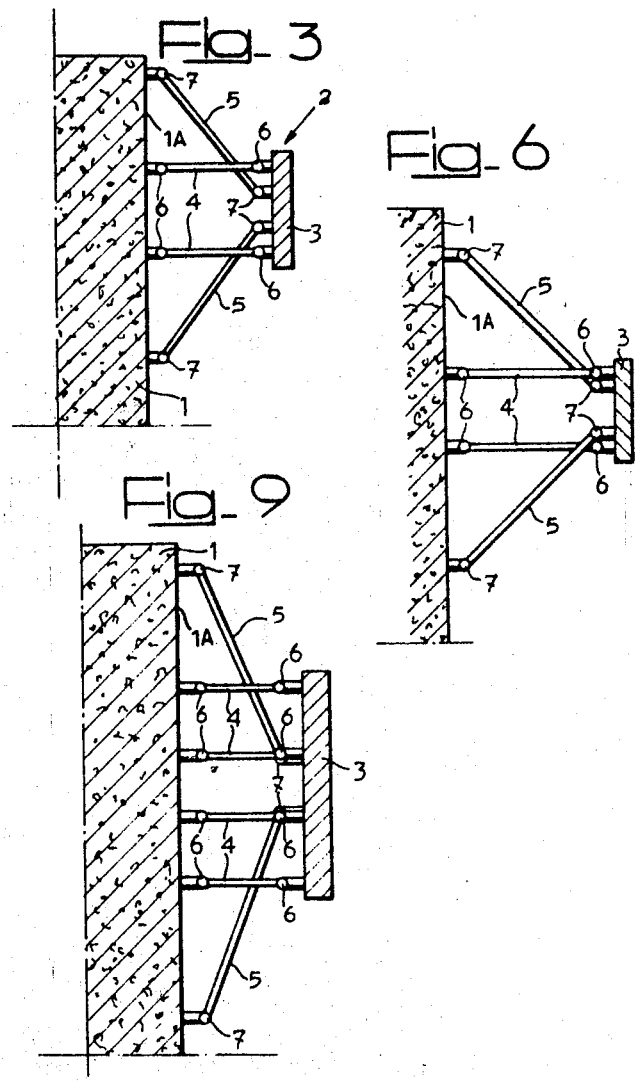

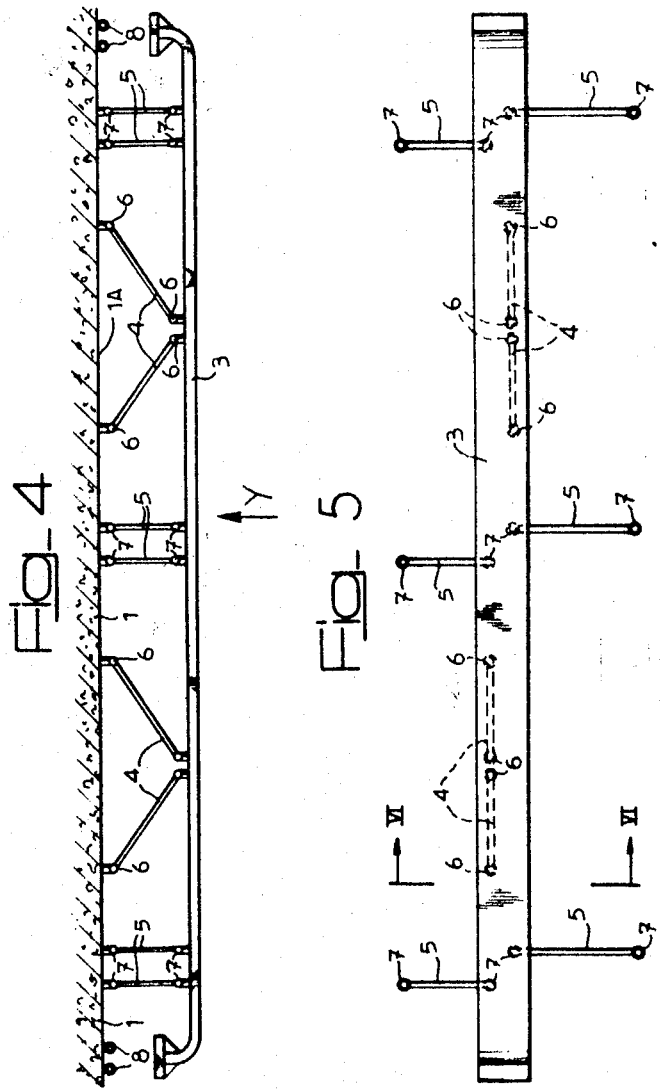

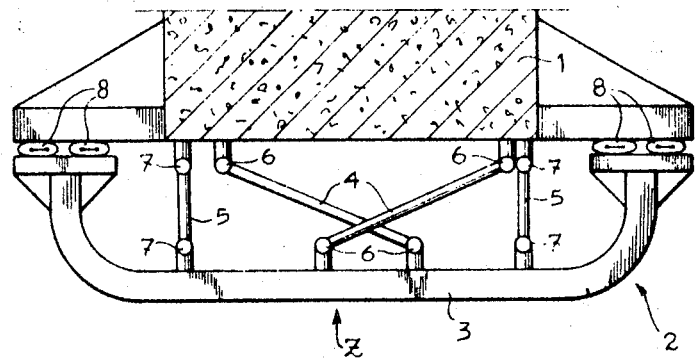
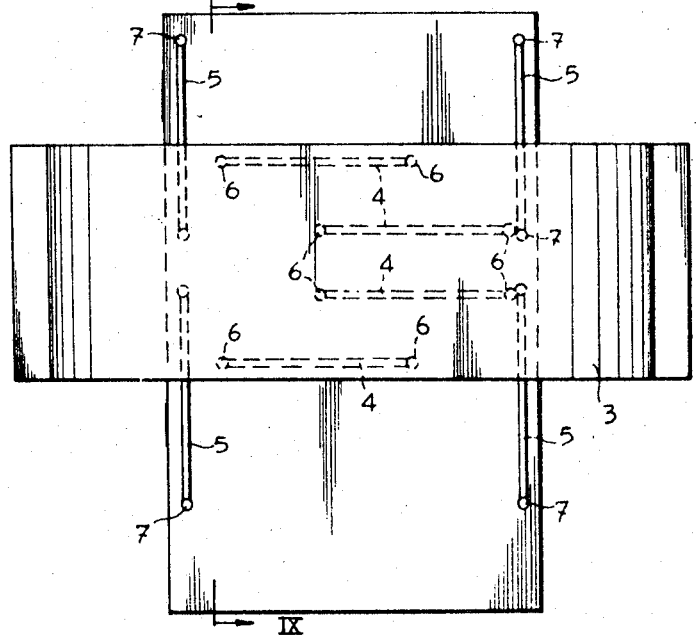

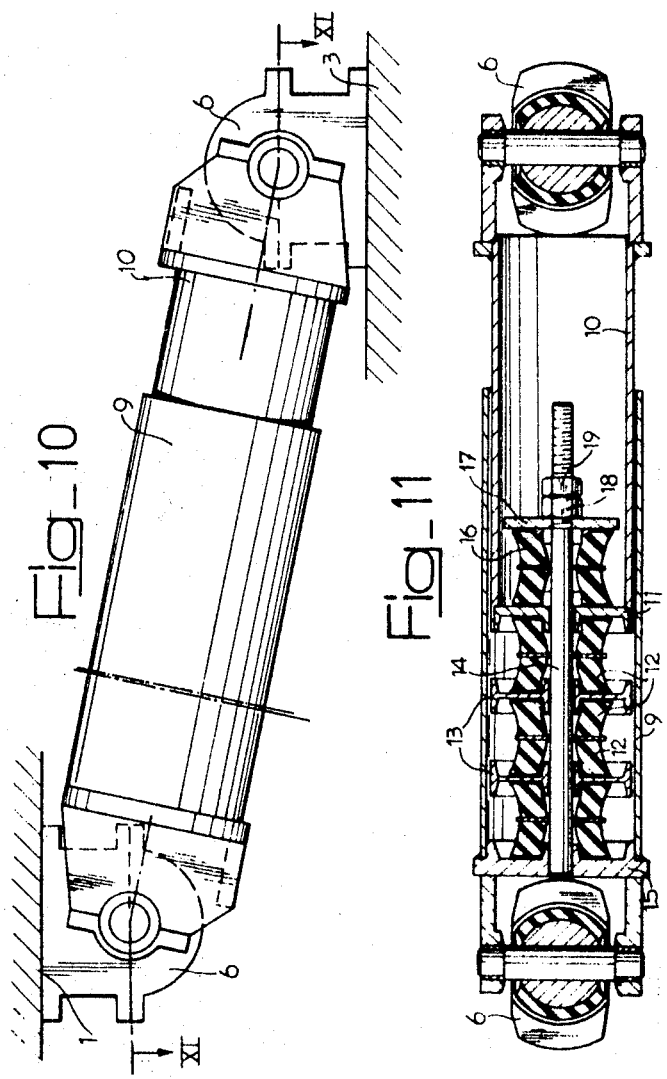

3,459,004
WHARF WITH A SHOCK-ABSORBING DEVICE
Emilio Morini, Milan, Italy, assignor to Società Applicazioni Gomma Antivibranti "SAGA" S.p.A., Milan, Italy
Filed Jan. 10, 1968, Ser. No. 696,775
Claims priority, application Italy, Apr. 27, 1967, 15,413-A/67
Int. Cl. E02b 3/22; B60r 19/06
U.S. Cl. 61—48  6 Claims

ABSTRACT OF THE DISCLOSURE

A rigid beam is suspended in a horizontal position parallel to a flank of the wharf by resilient suspension means which comprise an array of telescopic shock absorber. The arrangement of the shock absorbers is such that they converge by pairs towards the beams or the wharf or both. There are provided both absorbers with their axes inclined to said flank in vertical planes and absorbers with their axes inclined to said flank in horizontal planes.

---

The invention relates to resilient devices attached to wharves for the protection of ships by damping any shocks resultant from their mooring or coming alongside. Such a device also, of course, serves to protect a wharf to which it is attached.

An object of the present invention is to provide a resilient device of the above mentioned type exhibiting a high degree of flexibility which enables it to absorb large amounts of energy with the maximum efficiency.

Accordingly, the present invention consists in a wharf having a resilient device attached thereto for damping any shocks resultant from ships coming alongside, comprising a bumper in the form of a rigid beam and resilient suspension means connecting the said beam to a flank of the wharf in an at least substantially horizontal position at least substantially parallel to said flank.

The resilient suspension means advantageously comprises an array of telescopic shock absorbers, each absorber being provided at each end with a universal joint connecting the absorber by one of its ends to the wharf and by its other end to the beam, in an arrangement wherein the axis of each of the absorbers is inclined with respect to the flank of the wharf and beam so that the absorbers converge by pairs towards the beam or the wharf or both.

A device according to the invention will attenuate the abruptness of impact of a ship when coming alongside so that damage to the broadside of the ship is at least substantially avoided. Connection of the shock absorbers to the wharf and beam by means of joints of the types referred herein permits displacement of the beam in all directions, so that the operation of the device is isotropic, i.e. independent of the direction of impact.

In order that the invention may be more readily understood reference will now be made to the accompanying drawings which are given by way of example and in which:

FIG. 3 is a sectional view taken along line III—III of FIGURE 2;

FIG. 4 is a diagrammatical plan view of a modified embodiment of the invention;

FIG. 5 is a view along the arrow Y of FIGURE 4;

FIG. 6 is a sectional view taken along line VI—VI of FIGURE 5;

FIG. 7 is a diagrammatical plan view of a further modified embodiment;

FIG. 8 is a view along the arrow Z of FIG. 7;

FIG. 9 is a sectional view taken along line IX—IX of FIG. 8;

FIG. 10 is a side view of a shock absorber suitable for incorporation in a device according to the invention, the absorber shown in a condition of maximum crushing; and FIG. 11 is an axial sectional view taken along line XI—XI of FIG. 10, the shock absorber being shown, however, in an extended condition.

Like reference numerals are used for like parts throughout.

Figure 1:
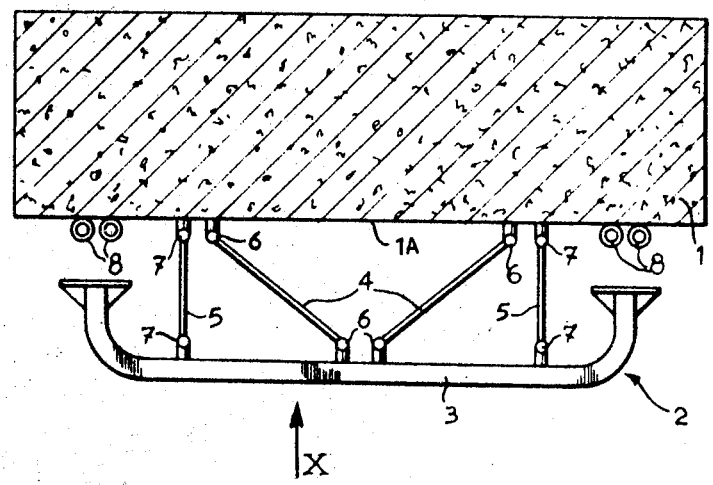
FIG. 1 is a diagrammatical plan view of a resilient device according to the invention, fitted to a wharf.
Figure 2:
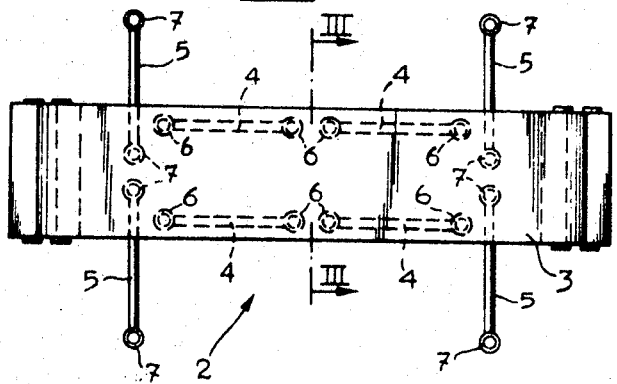
FIG. 2 is a view along the arrow X of FIGURE 1.

In FIGS. 1 and 3, there is shown a wharf to which a resilient device according to the invention is attached, this device being generally referenced 2 in FIGS. 1 to 3.

The device 2 comprises a rigid bumper 3 in the form of an elongated beam, formed for instance of steel, which is of rectangular cross section. The beam 3 is externally lined with rubber or wood (not shown) to prevent scratching of the broadside of a ship on impact. Herewith and as shown, the beam 3 is so connected to the wharf 1 as to lie substantially horizontally and substantially parallel to the flank 1A of the said wharf.

The beam 3 is connected to the wharf 1 by two pairs, i.e. an upper pair and a lower pair, of horizontally arranged shock absorbers 4 and two pairs i.e. a left pair and a right pair, of shock absorbers 5 the axes of which lie in vertical planes perpendicular to the flank 1A. For convenience the absorbers 5 will be referred to as the "vertically effective absorbers."

Each of the shock absorbers 4 and 5 is provided at each of its ends with an end ball joint for its connection at one end to the wharf 1 and by its other end to the beam 3. As shown, the joints associated with the absorbers 4 are referenced 6 and those associated with the absorbers 5 are referenced 7.

As will be seen from FIGS. 2 and 3, the two shock absorbers 4 of each pair lie in one and the same horizontal plane, but their axes therein are oppositely inclined with respect to the wharf and beam and converge, as shown in FIG. 1, towards the beam 3.

As also will be seen from FIGS. 2 and 3, the two pairs of shock absorbers 4 lie one in each of two different and parallel horizontal planes.

The converging ends of the horizontal shock absorbers 4 of each pair are attached to the middle portion of the beam 3 by their joints 6, their bodies substantially constituting the equal sides of an isosceles triangle. This is best seen in FIG. 1. Then thus exist two such isosceles triangles, each comprising the pair of absorbers 4 of one plane and each lying horizontally and parallel with the other in vertical separation therefrom.

The vertically effective shock absorbers 5 likewise converge towards the beam 3 but are attached to the end portions of the said beam, thus lying externally of the attachment points for the horizontal shock absorbers 4. The bodies of the shock absorbers 5 of each pair lie each in a common vertical plane transversely of the beam 3, and constitute two sides of a triangle. In FIG. 3 this is shown as an isosceles triangle but could be of any other type. There thus exist two such triangles, each lying in a vertical plane and each laterally spaced from the other.

As will by now be evident, the shock absorbers 5 together support, in addition to their own weight, the weight of the beam 3 and of the shock absorbers 4. The shock absorbers 4 and 5 jointly resiliently oppose translational and rotatory movements of the beam 3, thus permitting sprung displacements of the beam in all directions.

Advantageously, the ends of the beam 3 are bent towards the wharf 1 and the latter carries rubber pads 8 in front of the bent over ends of the beam 3, which pads resiliently limiting the approach movement of the said beam with respect to the wharf 1.

When a higher energy absorption and efficiency is called for, that is, with relatively short thrust on the beam 3, the shock absorbers may be so oriented that the first derivative of the load-yield diagram is a decreasing one. FIGS. 4 to 6 show such an embodiment of the invention wherein the beam 3 is supported by two pairs of horizontal shock absorbers 4 and three pairs of vertically effective shock absorbers 5.

As shown in FIG. 5 two pairs of horizontal absorbers 4 are spaced apart not only in height, (as was the case in the previously described embodiment), but also in a horizontal direction.

Of the three pairs of the vertically effective shock absorbers 5, one pair is attached to the middle portion of the beam 3, between the two pairs of shock absorbers 4, and the remaining two pairs are attached one to each end portion of the said beam externally of the shock absorbers 4.

Furthermore, the shock absorbers 5 of each pair are slightly staggered horizontally one with respect to the other, but their axes lie in vertical parallel planes.

The bodies of the co-planar horizontal shock absorbers of each pair and the planes of the bodies of the shock absorbers 5 of each pair respectively constitute the equal sides of horizontally and vertically disposed isosceles triangles (FIGS. 4 and 6). It is, however, to be borne in mind that the bodies of the shock absorbers 5 could alternatively constituted two sides of any other triangle.

FIGS. 7, 8 and 9 show a further modified embodiment of the invention, comprising two pairs of absorbers 5 arranged as previously described with reference to FIGS. 1 to 3. In this modified embodiment, however, instead of the four horizontal absorbers 4 being arranged in pairs of co-planar absorbers along the lines previously referred to, all four of the said horizontal shock absorbers 4 are vertically spaced with respect to each other also a degree of horizontal spacing of the manner shown in FIG. 8.

With this arrangement the geometrical axes of the horizontal shock absorbers 4 can of course intersect one another, so that longer shock absorbers 4 can be employed than in the case of the previous embodiments, such absorbers being strongly inclined with respect to the previously described structures. In this way overall flexibility of the device may be increased.

FIGS. 10 and 11 show a shock absorber suitable for use in a device according to the invention.

The illustrated shock absorber comprises two tubular sections 9, 10 so differing slightly in diameter one with respect to the other as to telescope one with the other. The inner end of the smaller diameter section 10 is thus enclosed by the section 9 and is closed by a centrally apertured cover 11. A set of tubular rubber compression springs 12 are arranged coaxially within the section 9 and are separated from one another by metal centering rings 13 which are axially slidable in the section 9.

A rod 14 extends axially through the springs 12 and rings 13 and is secured by one end to the middle of a cover 15 closing the free end of the member 9. The other end of the rod 14 extends, through the aperture in the cover 11, into the section 10 wherein it has mounted thereon a further tubular rubber compression spring 16. As shown the rod 14 extends through the spring 16.

The terminal portion of the rod 14 within the section 10 is screw threaded and extends slidingly through a centrally apertured disc 17. A nut 18 is screwed onto the threaded portion of the rod 14 to pre-compress the springs 12, between the covers 11 and 15, and the spring 16, between the cover 11 and disc 17. A lock nut 19 is screwed onto the threaded portion of the rod 14 and locks the nut 18 thereon.

The two ends of the shock absorber are provided with joints (referenced 6 for a shock absorber 4), suitable for connection with the wharf 1 and beam 3 in the manner previously described. In the embodiment shown in FIGS. 10 and 11 the joints 6 are of the ball type, but in practice, cardan joints, which are less expensive, may be employed. The term "universal joint" as used herein is intended to encompass both the ball and cardan joints.

Various modifications of the invention are of course possible within the scope of the appended claims.

What I claim is:

1. A wharf structure comprising a resiliently effective device attached to a flank of the wharf for damping shocks resultant from ships coming alongside, wherein said device comprises a bumper in the form of a rigid beam, and resilient suspension means supporting said beam from the wharf in a substantially horizontal position at least substantially parallel to the flank of the wharf, said resilient suspension means essentially consisting of an array of telescopic shock absorbers comprising a plurality of absorbers inclined to said flank in vertical planes substantially perpendicular to the flank and a plurality of absorbers inclined to the flank in horizontal planes, each absorber being provided at its opposite ends with a universal joint connecting the absorber by one of its ends to the wharf and by its other end to the beam, in an arrangement wherein the absorbers converge by pairs towards the beam.

2. The structure of claim 1, wherein the shock absorbers in each pair are co-planar.

3. The structure of claim 1, wherein the shock absorbers in each pair of absorbers inclined in a vertical plane are co-planar and are arranged to constitute the equal sides of an isosceles triangle.

4. The structure of claim 1, wherein the shock absorbers in each pair of absorbers inclined in a horizontal plane are co-planar and are arranged to constitute the equal sides of an isosceles triangle.

5. The structure of claim 1, wherein the pairs of horizontally inclined shock absorbers are arranged at different horizontal planes.

6. The structure of claim 1, comprising said beam having turned-over ends directed towards the wharf, and resilient pad means supported by the wharf in front of each of said ends of the beam to resiliently limit the approach of said ends to the wharf.

References Cited

UNITED STATES PATENTS

| 1,250,604 | 12/1917 | Lorenc | 114—219 |
| 3,039,757 | 6/1962 | Barr | 267—1 |
| 3,235,244 | 2/1966 | Hein | 114—219 X |

FOREIGN PATENTS

| 1,031,969 | 3/1953 | France. |
| 758,566 | 10/1956 | Great Britain. |

OTHER REFERENCES

German printed application, No. 1,088,432, 9/1960, Grun et al.

JACOB SHAPIRO, Primary Examiner

U.S. Cl. X.R.

114—219; 267—1; 293—72